United States Patent
Kehl et al.

(10) Patent No.: US 12,282,821 B1
(45) Date of Patent: Apr. 22, 2025

(54) DEVICE INSTALLATION SYSTEM, RELATED TOOLS, AND METHODS

(71) Applicants: Tyco Electronics Raychem GmbH, Ottobrunn (DE); TE Connectivity Solutions GmbH, Schaffhausen (CH)

(72) Inventors: Ladislaus Kehl, Ottobrunn (DE); Thomas Schoepf, Ottobrunn (DE); Kathryn Marie Maher, Fuquay-Varina, NC (US); Daniel Ferreira Ribeiro, Fuquay-Varina, NC (US)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 0 days.

(21) Appl. No.: 18/425,053

(22) Filed: Jan. 29, 2024

(51) Int. Cl.
  *G06K 7/10* (2006.01)
  *G01S 19/13* (2010.01)
  *H04B 5/73* (2024.01)

(52) U.S. Cl.
  CPC .......... *G06K 7/10297* (2013.01); *G01S 19/13* (2013.01); *H04B 5/73* (2024.01)

(58) Field of Classification Search
  CPC ........ G06K 7/10297; G01S 19/13; H04B 5/73
  See application file for complete search history.

(56) References Cited

U.S. PATENT DOCUMENTS

2021/0205976 A1* 7/2021 Matei ................... G08B 7/06
2022/0063068 A1* 3/2022 Patch ............... G06K 7/10297

* cited by examiner

*Primary Examiner* — Laura A Gudorf

(57) ABSTRACT

The present disclosure describes a device installation system. The system includes a device having a wireless communication tag that stores device identification information and torque information for installing the device via a threaded fastener. The system further includes a tool for applying torque to the threaded fastener to install the device. The tool includes a wireless communication tag reader, a temperature sensor, and at least one processor in communication with the wireless communication tag reader and the temperature sensor. The processor is configured to obtain the device identification information and the torque information from the tag via the tag reader; obtain ambient temperature information in a vicinity of the device via the temperature sensor; and determine an amount of torque required to apply to the threaded fastener to install the device using the obtained device identification information, torque information, and ambient temperature information. Related tools and methods are also described herein.

20 Claims, 11 Drawing Sheets

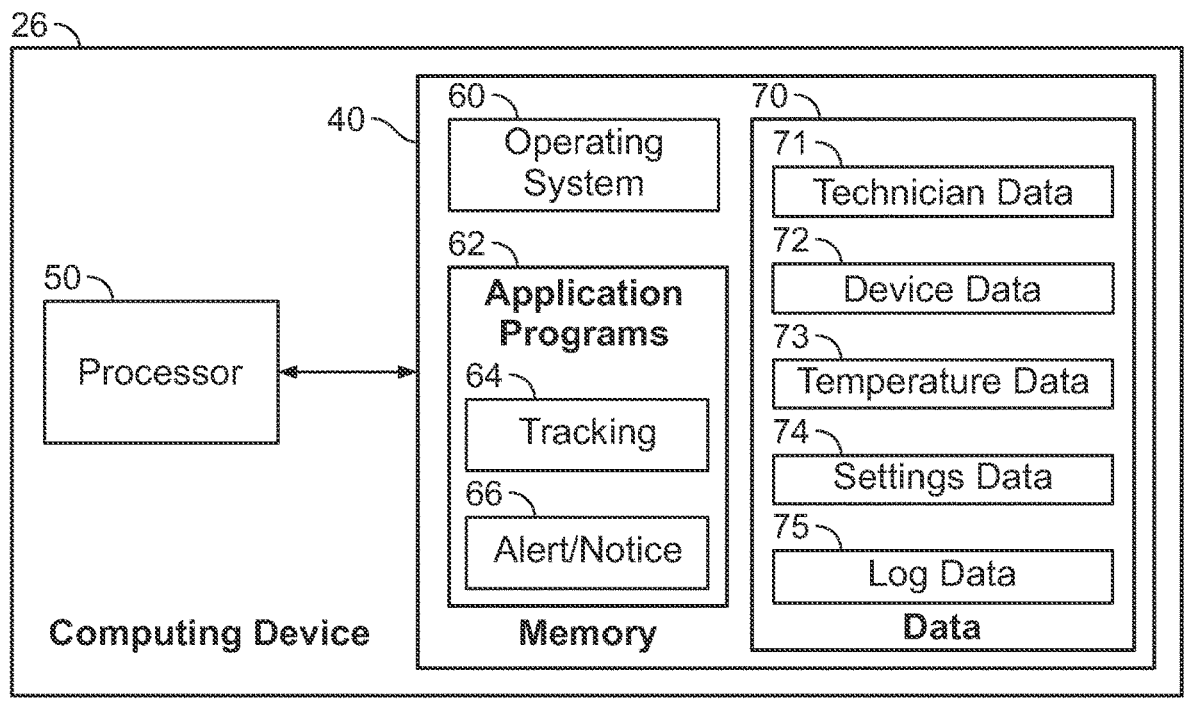
Fig. 2
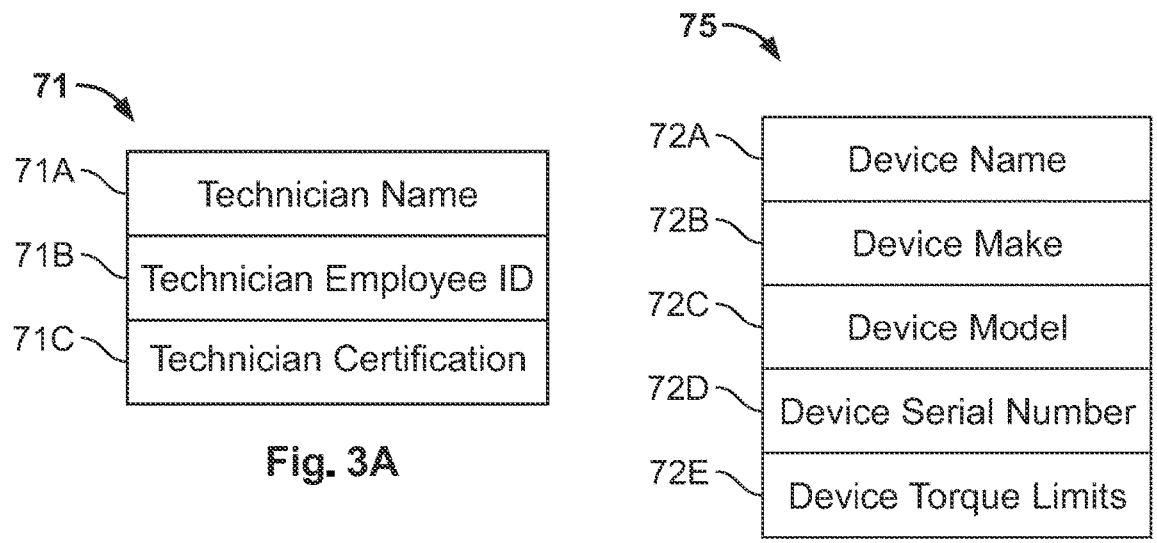
Fig. 3A
Fig. 3B

DEVICE INSTALLATION SYSTEM, RELATED TOOLS, AND METHODS

FIELD

The present invention relates to device installation, and more particularly, to an installation device installation system, related tools and methods.

BACKGROUND

When installing certain types of devices, for example, electrical connectors, a specific amount of torque must be applied in order to properly fasten the corresponding bolt(s) of the device. Currently, a technician uses a cordless drill or other similar tool to perform the installation of these, as well as other, types of devices. There may be a desire for a "smart" tool that can adjust the applied torque during the installation of the device based on real-time conditions, as well as record and store other data related to the installation.

SUMMARY

Embodiments of the present invention are directed to a device installation system. The device installation system includes a device having a wireless communication tag that stores device identification information and torque information for installing the device via a threaded fastener. The system further includes a tool for applying torque to the threaded fastener to install the device. The tool includes a wireless communication tag reader, a temperature sensor, and at least one processor in communication with the wireless communication tag reader and the temperature sensor. The processor is configured to obtain the device identification information and the torque information from the wireless communication tag via the wireless communication tag reader; obtain ambient temperature information in a vicinity of the device via the temperature sensor; and determine an amount of torque required to apply to the threaded fastener to install the device using the obtained device identification information, torque information, and ambient temperature information.

Further embodiments of the present invention are directed to a tool for installing a device that is configured to apply torque to a fastener to install the device. The tool includes a wireless communication tag reader, a temperature sensor, and at least one processor in communication with the wireless communication tag reader and the temperature sensor. The processor is configured to obtain, via the wireless communication tag reader, device identification information and torque information from a wireless communication tag associated with the device; obtain ambient temperature information in a vicinity of the device via the temperature sensor; and determine an amount of torque required to apply to the threaded fastener during installation of the device using the obtained device identification information, torque information, and ambient temperature information.

Further embodiments of the present invention are directed to a method of installing a device via a tool, where the device includes a passive wireless communication tag storing device identification information and torque information for installing the device via a threaded fastener, and where the tool is configured to apply torque to the fastener to install the device and includes a wireless communication tag reader, a temperature sensor, and at least one processor in communication with the wireless communication tag reader and the temperature sensor. The method includes the steps of (i) obtaining, via the wireless communication tag reader, the device identification information and torque information from the wireless communication tag associated with the device; (ii) obtaining ambient temperature information in a vicinity of the device via the temperature sensor; and (iii) determining, via the at least one processor, an amount of torque to apply to the at least one threaded fastener to install the device using the device identification information, the torque information, and the ambient temperature information.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIG. 2 is a block diagram of a computing device used with the system of FIG. 1 according to embodiments of the present invention.

FIG. 3A is a block diagram illustrating exemplary technician data provided by or available through the computing device of FIG. 2.

FIG. 3B is a block diagram illustrating exemplary device data provided by or available through the computing device of FIG. 2.

DETAILED DESCRIPTION

Figure 1:
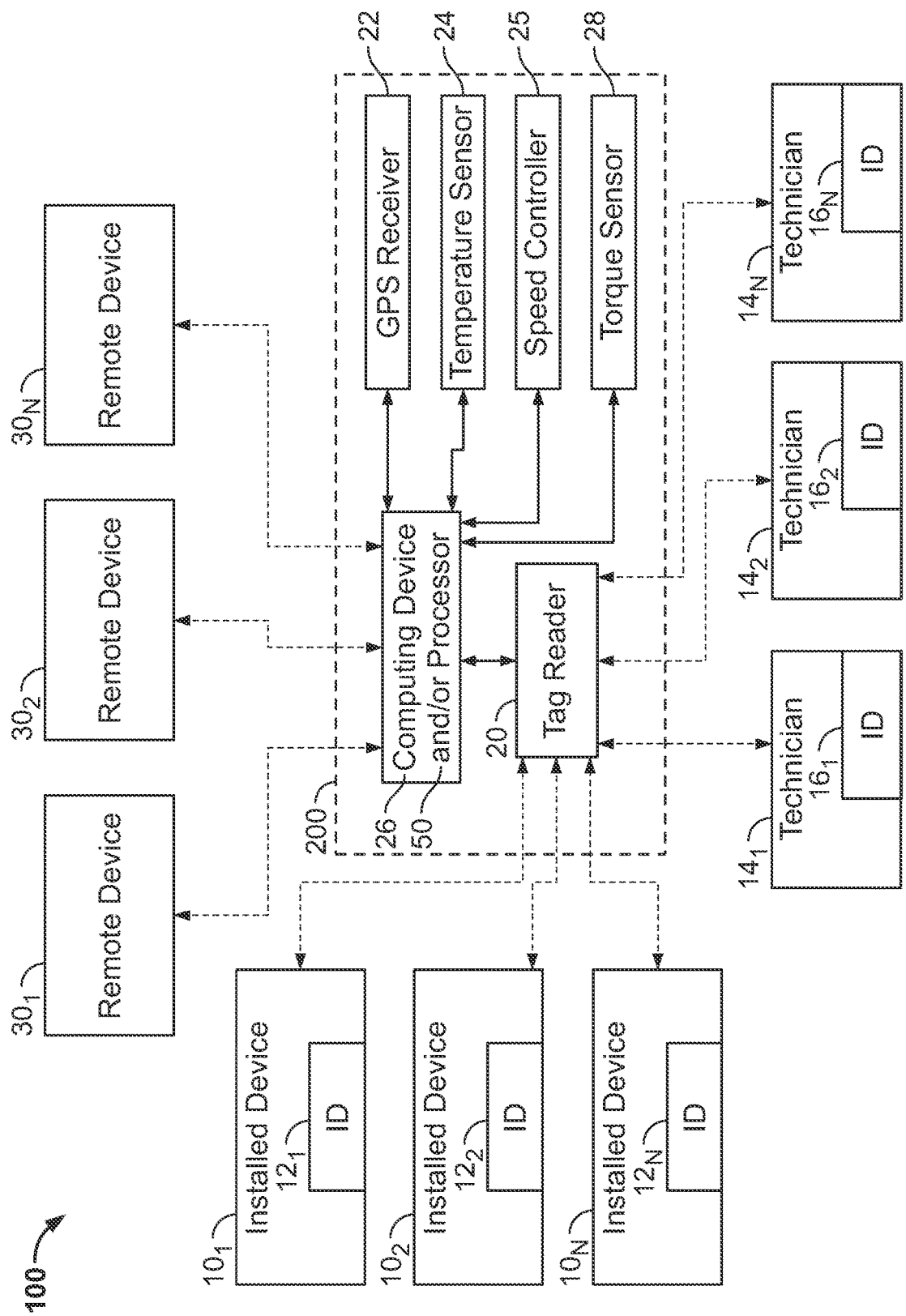
FIG. 1 is a block diagram of a device installation system according to embodiments of the present invention.
Figure 3C:
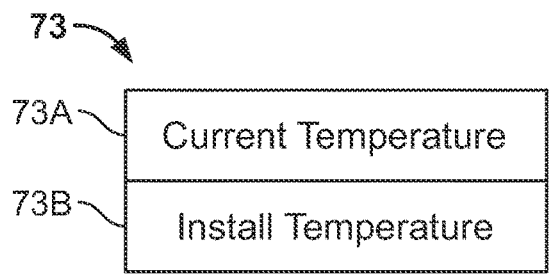
FIG. 3C is a block diagram illustrating exemplary temperature data provided by or available through the computing device of FIG. 2.
Figure 3D:
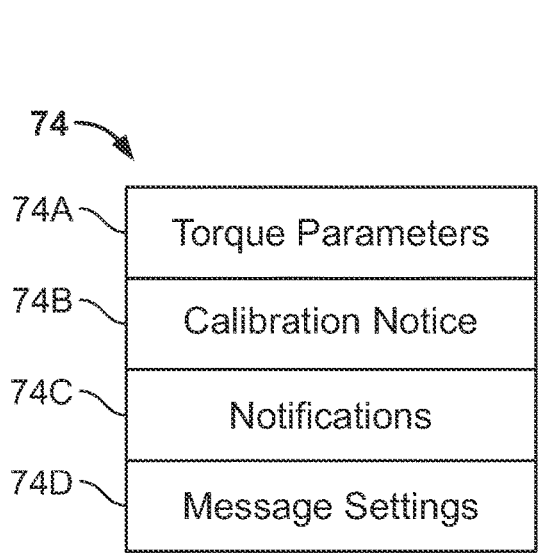
FIG. 3D is a block diagram illustrating exemplary settings data provided by or available through the computing device of FIG. 2.
Figure 3E:
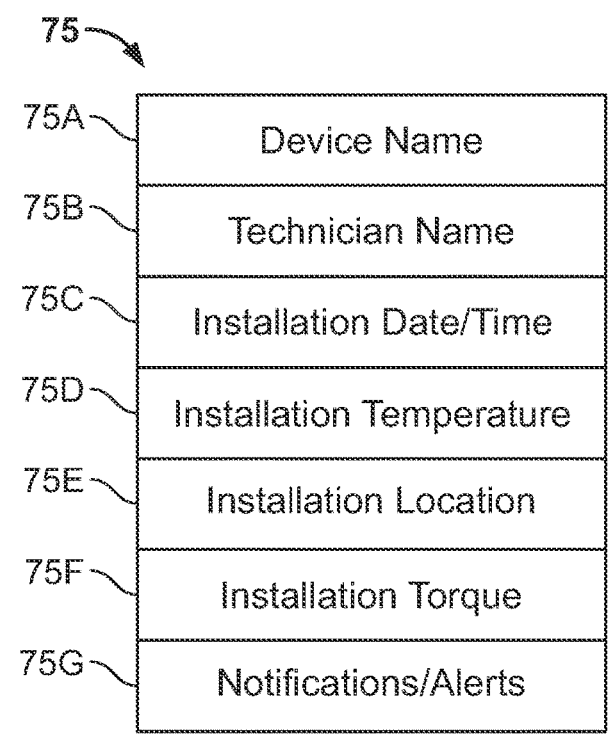
FIG. 3E is a block diagram illustrating exemplary log data provided by or available through the computing device of FIG. 2.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present invention will now be discussed in greater detail below with reference to FIGS. 1-11.

Referring to FIG. 1, a device installation system 100 according to embodiments of the present invention is illustrated. The device installation system 100 includes at least one device 10 to be installed. A plurality of devices $10_1$, $10_2$, $10_N$ to be installed are shown in FIG. 1. As used herein, the letter or subscript "N" may represent any number greater than three (3). As described in further detail below, in some embodiments, a torque must be applied to at least one fastener 11 (e.g., threaded fastener) to install the respective devices 10 (see, e.g., FIG. 6 and FIG. 7).

Figure 11:
FIG. 11 shows another exemplary device (i.e., a bolt actuated tap connector) that can be installed according to embodiments of the present invention.
Figure 11:
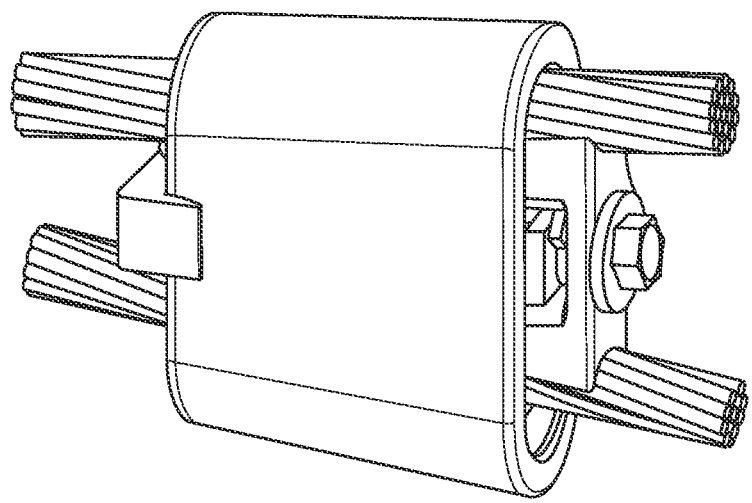

As described in further detail below, the devices $10_1$, $10_2$, $10_N$ may include an electrical connector, for example, but not limited to, an insulation piercing connector (FIG. 6), a shear bolt connector (FIGS. 10A-10F), or a bolt actuated tap connector (FIG. 11). While many of the embodiments described herein are directed to the installation of an electrical connector, the device installation system 100 of the present invention may be used in connection with any device that requires a proper amount of torque to be applied to a fastener during installation to the corresponding device, for example, mechanical connectors, tire rims, and engine covers.

As shown in FIG. 1, the devices to be installed $10_1$, $10_2$, $10_N$ each have a respective identification device $12_1$, $12_2$, $12_N$ (also referred to herein as "a wireless communication tag"). In some embodiments, the identification devices $12_1$, $12_2$ and $12_N$ may be radio-frequency identification (RFID) chips or tags that are attached to or otherwise held in or on the device $10_1$, $10_2$ and $10_N$ to be installed, respectively. It is contemplated that the identification devices $12_1$, $12_2$ and $12_N$ may be devices that use other short-range wireless communication protocols, such as near-field communication (NFC) tags or Bluetooth devices. For example, alternative identification devices $12_1$, $12_2$ and $12_N$ may include integrated QR-code or bar-code readers. However, for ease of discussion, the identification devices $12_1$, $12_2$, $12_N$ are generally referred to herein as RFID tags. The RFID tags $12_1$, $12_2$, $12_N$ may be passive or active.

The device installation system 100 of the present invention further includes one or more wireless communication tag readers 20. In some embodiments, the wireless communication tag reader 20 is configured to detect signals from the identification devices $12_1$, $12_2$, $12_N$ (e.g., radio waves from RFID tags) and obtain information about the respective device $10_1$, $10_2$, $10_N$ from the identification devices $12_1$, $12_2$, $12_N$. For example, as described further below, the identification devices $12_1$, $12_2$, $12_N$ may contain device identification information and torque information for the respective device $10_1$, $10_2$, $10_N$. In some embodiments, the device identification information may include the device name (e.g., a unique device identifier to distinguish the device from the other devices), the device make or manufacturer, and the device model and/or serial number. In some embodiments, the torque information may include the type of fastener and the amount of torque required (e.g., pound-feet) to tighten (or shear off) the respective fastener.

In some embodiments, the wireless communication tag reader 20 may further be configured to read technician or user identification devices $16_1$, $16_2$ and $16_N$ that are associated with technicians or users $14_1$, $14_2$ and $14_N$, respectively, for example, when a technician is installing a respective device $10_1$, $10_2$, $10_N$. In other embodiments, a second wireless communication tag reader 20 may be configured to read the user identification device $16_1$, $16_2$ and $16_N$ (i.e., in addition to the wireless communication tag reader 20 configured to detect signals from the identification devices $12_1$, $12_2$, $12_N$). The identification devices $16_1$, $16_2$, $16_N$ may be or include RFID chips or tags (e.g., held in a key fob or the like, see FIG. 8A) or may be an identification card with an identification feature such as a bar bode or magnetic strip. Optionally, no user identification device and/or corresponding reader is required. The users $14_1$, $14_2$ and $14_N$ may also use a remote device $30_1$, $30_2$, $30_3$ such as smartphones, tablets, or the like that can communicate with an input of the system 100, as described in further detail below. It is noted that the users $14_1$, $14_2$ and $14_N$ are often referred to herein as technicians. However, the users may be any user that installs a device $10_1$, $10_2$, $10_N$ using a corresponding tool 150 (see, e.g., FIG. 5). In some embodiments, the wireless communication tag reader 20 may be configured to detect the presence of the devices $10_1$, $10_2$, $10_N$ and/or users $14_1$, $14_2$ and $14_N$ within a predetermined distance from the reader 20.

Still referring to FIG. 1, in some embodiments, the wireless communication tag reader(s) 20 may be provided in a module 200. As described in further detail below, in some embodiments, the module 200 may be installed on or within a housing of a tool 150, thereby forming a "sensored" installation tool 150 (see, e.g., FIG. 5). In other embodiments, one or more of components of the module 200 (e.g., the reader 20), may be installed directly within the housing of the tool 150.

The device installation system 100 of the present invention further includes at least one computing device 26 that is in communication with the reader 20 (see also FIG. 2). In some embodiments, the computing device 26 may reside within the module 200.

The device installation system 100 also includes a temperature sensor 24. In some embodiments, the temperature sensor 24 may be in communication with the computing device 26. In some embodiments, the temperature sensor 24 may be provided within the module 200. The temperature sensor 24 may be configured to detect the ambient temperature in a vicinity of a device $10_1$, $10_2$, $10_N$ during installation of the respective device $10_1$, $10_2$, $10_N$.

The device installation system 100 also includes a Global Positioning System (GPS) receiver 22 (see, e.g., FIG. 1). In some embodiments, the GPS receiver 22 may be in communication with the computing device 26 and/or processor 50. In some embodiments, the GPS receiver 22 may be provided within the module 200. The GPS receiver 22 may be configured to determine coordinates of a location of the device $10_1$, $10_2$, $10_N$ (e.g., the location that the device $10_1$, $10_2$, $10_N$ is being installed). In some embodiments, the GPS receiver 22 may be used to locate a tool 150 (e.g., provide the location of the tool 150 if misplaced).

In some embodiments, the device installation system 100 may also include a speed controller 25 (see, e.g., FIG. 1). The speed controller 25 may be in communication with the computing device 26 and/or processor 50. In some embodiments, the speed controller 25 may be provided within the module 200. The speed controller 25 may be configured to control the speed of the tool 150, e.g., to control the rotational speed of a drill when tightening a fastener 11.

In some embodiments, the device installation system 100 may also include a torque sensor 28 (see, e.g., FIG. 1). The torque sensor 28 may be in communication with the computing device 26 and/or processor 50. In some embodiments, the torque sensor 28 may be provided within the module 200. The torque sensor 28 may be configured to provide feedback on the amount of torque being applied by the tool 150.

In some embodiments, the computing device 26 is configured to automatically track and maintain a log of the devices $10_1$, $10_2$, $10_N$ as they are installed at a location by the technicians $14_1$, $14_2$, $14_N$. In some embodiments, the computing device 26 is configured to communicate with one or more remote devices $30_1$, $30_2$, $30_N$. For example, as will be described in greater detail below, the computing device 26 may be configured to send alerts or notifications to the one or more remote devices $30_1$, $30_2$, $30_N$ when one or more triggering events associated with the devices $10_1$, $10_2$, $10_N$ and/or the technicians $14_1$, $14_2$, $14_N$ occur. The remote devices $30_1$, $30_2$, $30_N$ may be described herein as defined user remote devices, meaning that the remote devices $30_1$, $30_2$, $30_N$ are under the control of defined users such as one or more supervisors of the technicians $14_1$, $14_2$, $14_N$. In some embodiments, at least some of the remote devices $30_1$, $30_2$, $30_N$ are under control of the users or technicians $14_1$, $14_2$, $14_N$ to receive alerts or notices.

As shown in FIG. 2, the computing device 26 may include a memory 40 that communicates with one or more processors 50 (generally referred to herein as "the processor"). Communication infrastructure between the components of FIG. 2 may include one or more device interconnection buses such as Ethernet, Peripheral Component Interconnect (PCI), and the like.

The memory 40 may include application programs 62 and data 70 installed thereon. The data 70 may include technician data 71 associated with the technicians $14_1$, $14_2$, $14_N$, device data 72 associated with the installed devices $10_1$, $10_2$, $10_N$, temperature data 73, system settings data 74 and/or log data 75. The application programs 62 may include a tracking program 64 that may be configured to monitor the data associated with the devices $10_1$, $10_2$, $10_N$, the technicians $14_1$, $14_2$, $14_N$, the temperature sensor 24 and/or the system settings stored in the memory 40.

The application programs 62 may also include an alarm and notification program 66 that may be configured to detect different defined triggering events, select an alarm or notification protocol based on the detected triggering event, generate an appropriate alert or notice based on the selected alarm or notification protocol and transmit the alert or notice to one or more defined users. The tracking program 62 and/or the alarm and notification program 64 may dynamically update the log data 75.

The memory 40 may further include an operating system 60 installed therein. The operating system 60 generally controls the operation of the computing device 26. In particular, the operating system 60 may manage software and/or hardware resources and may coordinate execution of application programs by the processor 50.

The system 100 includes a communication interface configured to transfer information (e.g., log data 75) between the memory 40 and another computer system or a network using, for example, an Internet protocol (IP) connection. For example, as shown in FIG. 1, the communication interface may be configured such that the computing device 26 communicates with the remote devices $30_1$, $30_2$, $30_N$ (e.g., smartphone or tablet) via Bluetooth/Wi-Fi or any type of cellular communication, including, for example, 2G, 3G, 4G, 5G, 5G+, LTE, or other cellular communications. The communication interface may additionally or alternatively be configured such that the computing device 26 communicates with the remote devices $30_1$, $30_2$, $30_N$ via a GPS satellite, a local wireless network, a Mobile Telephone Switching Center (MTSC) and/or a Public Service Telephone Network (PSTN) (i.e., a "landline" network) (see also, e.g., FIG. 8C).

FIGS. 3A-3E illustrate the types of data that may be accessed, stored and/or maintained directly or indirectly in the device installation system 100, e.g., for the technician data 71, the device data 72, the temperature data 73, the system settings data 74 and the log data 75, respectively.

The technician data 71 may include a technician name 71A (e.g., a unique technician identifier to distinguish the technician installing a device from the other technicians), a technician employee identification number 71B, and/or the certification status of the technician 71C. In some embodiments, the technician name 71A, identification number 71B and certification status 71C is included on the identification device $16_1$, $16_2$, $16_N$ associated with the particular technician $14_1$, $14_2$, $14_N$, and the reader 20, where used, may read the data and transmit the data to the computing device 26 and/or the processor 50 (FIG. 1).

The device data 72 may include data for each of the installed devices $10_1$, $10_2$, $10_N$. The device data 72 may include a device name 72A (e.g., a unique device identifier to distinguish the device from the other devices), a device make or manufacturer 72B, a device model 72C, a device serial number 72D, and data which respect to torque limits for the device $10_1$, $10_2$, $10_N$, for example, based on ambient temperature 72D. In some other embodiments, some or all of this data is included on the identification device $12_1$, $12_2$, $12_N$ associated with the particular installed device $10_1$, $10_2$, $10_N$, and the reader 20 may electronically read the data and transmit the data to the computing device 26 and/or the processor 50 (FIG. 1).

The temperature data 73 may include data communicated from the temperature sensor 24 of the current temperature 73A and/or the ambient temperature 73B in the vicinity of the device $10_1$, $10_2$, $10_N$ during installation.

The systems settings data 74 may include torque parameters (information) 74A for each device $10_1$, $10_2$, $10_N$, a device calibration notice setting 74B for each device $10_1$, $10_2$, $10_N$, an alert/notification setting 74C, and/or one or more users' message settings 74D. As used herein, the term "setting" may include a field in a database that can be automatically or manually populated. In some other embodiments, some or all of this data is included on the identification device $12_1$, $12_2$, $12_N$ associated with the particular device $10_1$, $10_2$, $10_N$ or on the identification device $14_1$, $14_2$, $14_N$ associated with the particular technician $16_1$, $16_2$, $16_N$, and the reader 20 may read the data and transmit the data to the computing device 26 and/or the processor 50 (FIG. 1).

As will be described in more detail below, a triggering event occurs when one of the devices $10_1$, $10_2$, $10_N$ or particular technicians $16_1$, $16_2$, $16_N$ is not detected by the reader 20. For example, it is possible that the RFID tags $12_1$, $12_2$, $12_N$ associated with the device 10 may be missed and/or the RFID tags $14_1$, $14_2$, $14_N$ associated with the technician $16_1$, $16_2$, $16_N$ may be missed by the reader 20 on two successive reads or multiple successive reads. Accordingly, the alarm and notification module 66 may be set to an appropriate time for the reader 20 to read all the RFID tags $12_1$, $12_2$, $12_N$, $14_1$, $14_2$, $14_N$ in the allotted time (and thereby prevent unwarranted triggering events and alerts).

As noted above, the computing device 26 is configured to directly or indirectly access, maintain and/or provide a log associated with installation of devices $10_1$, $10_2$, $10_N$. The data for the log can be stored and dynamically updated in the log data 75. The log data 75 may include the device name 75A, the name of the technician that installed the device 75B, the date and time the device was installed 75C, the ambient temperature at the time the device was installed 75D, the location of the installation 75E, and/or the torque used to install the device 75F. The log data 75 may also include any notifications and/or alerts that have occurred 75G.

In some embodiments, certain functionality or features (e.g., the memory 40 and/or one or more of the processors 50) of the computing device 26 (FIG. 2) can be performed or reside at least in part on a server that can be remote from the installation site of the respective device(s) $10_1$, $10_2$, $10_N$. Alternatively, the server can be onsite or the computing device 26 can partially or totally reside onboard a computer associated with the installation tool 150. The server can be integrated into a single server or may be distributed into one or more servers or other circuits or databases at a single physical site or at spatially separate locations. Similarly, certain functionality or features of the computing device 26 held by the one or more servers, can be distributed into multiple processors or databases or integrated into one.

The server may be embodied as a standalone server or may be contained as part of other computing infrastructures. The server may be embodied as one or more enterprise, application, personal, pervasive and/or embedded computer systems that may be standalone or interconnected by a public and/or private, real and/or virtual, wired and/or wireless network including the Internet, and may include various types of tangible, non-transitory computer-readable media. The server may also communicate with the network via wired or wireless connections, and may include various types of tangible, non-transitory computer-readable media.

The server can be provided using cloud computing which includes the provision of computational resources on demand via a computer network. The resources can be embodied as various infrastructure services (e.g., compute, storage, etc.) as well as applications, databases, file services, email, etc. In the traditional model of computing, both data and software are typically fully contained on the user's computer; in cloud computing, the user's computer may contain little software or data (perhaps an operating system and/or web browser), and may serve as little more than a display terminal for processes occurring on a network of external computers. A cloud computing service (or an aggregation of multiple cloud resources) may be generally referred to as the "Cloud". Cloud storage may include a model of networked computer data storage where data is stored on multiple virtual servers, rather than being hosted on one or more dedicated servers.

Users can communicate with the server via a computer network, such as one or more of local area networks (LAN), wide area networks (WAN) and can include a private intranet and/or the public Internet (also known as the World Wide Web or "the web" or "the Internet").

Figure 4:
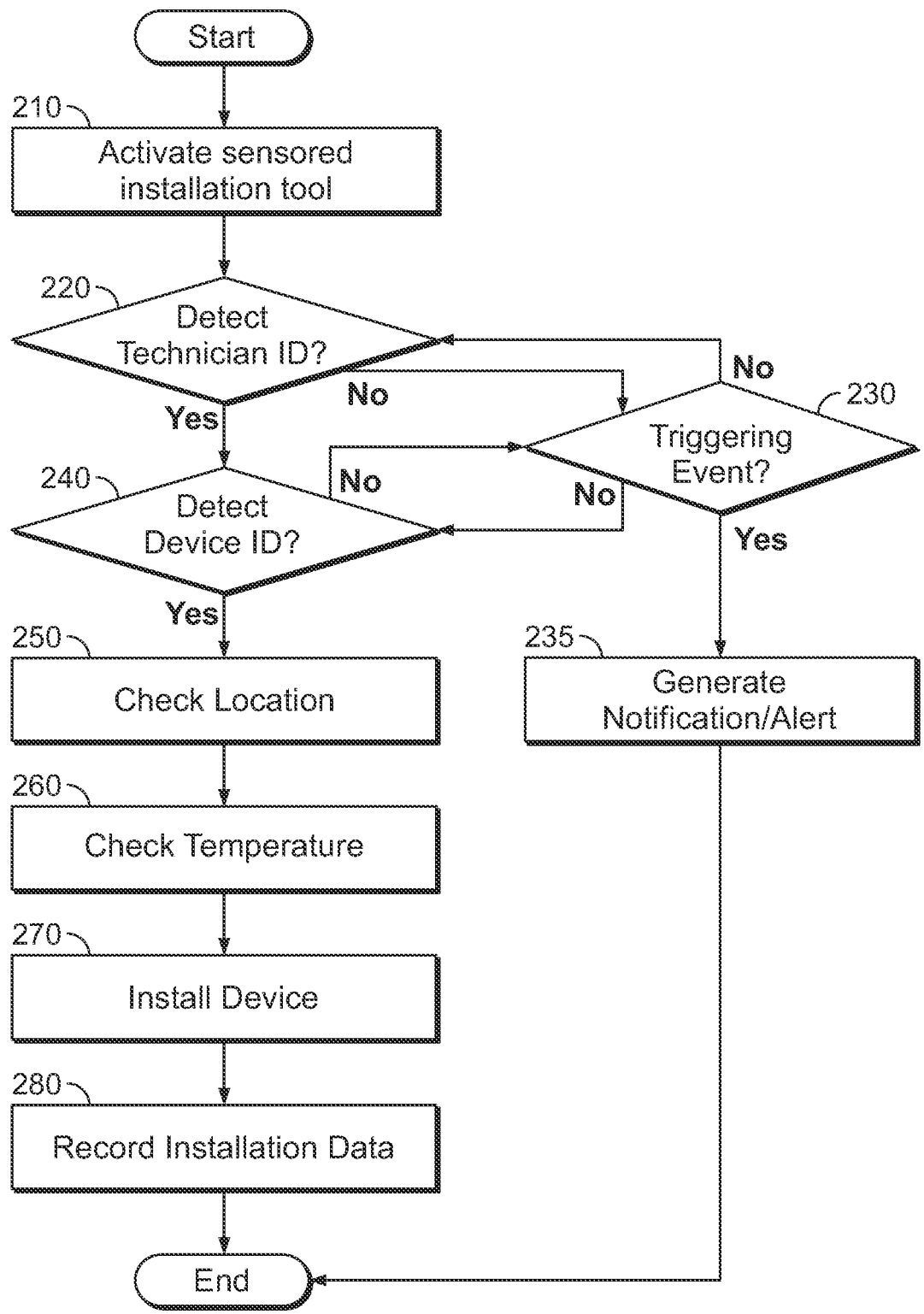
FIG. 4 is a flow diagram illustrating exemplary operations that may be carried out by the system of FIG. 1 according to embodiments of the present invention.

FIG. 4 illustrates an exemplary operation that may be carried out by the system of FIG. 1 according to embodiments of the present invention. As shown in FIG. 4, the operation begins with activation of the installation tool 150 (and associated module 200, where applicable) (e.g., turning the tool "ON") (block 210). For case of discussion, the operations described herein may refer to the device $10_1$, the technician $14_1$, and the respective identification device or RFID tag $12_1$, $16_1$, but it will be understood that the operations may apply to any combination of the devices $10_1$, $10_2$, $10_N$ and technicians $14_1$, $14_2$, $14_N$ (and respective RFID tags $12_1$, $12_2$, $12_N$, $16_1$, $16_2$, $16_N$).

The wireless communication readers 20 can detect or read the identification device or RFID tag $16_1$ associated with the technician $14_1$ (block 220). In some embodiments, activation of the installation tool 150 may automatically detect the technician identification device or RFID tag $16_1$ by the reader 20 for the particular technician $14_1$ who activated the tool 150 (see also, FIG. 1). If undetected, the reader 20 may continuously attempt to detect or read the technician's tag $16_1$. Once the RFID tag $16_1$ is detected, the computing device 26 automatically confirms the technician's information and may continuously or periodically check for the occurrence of a triggering event associated with the technician (block 230). If a triggering event occurs, for example, the technician $14_1$ is not certified to perform the installation of a device $10_1$ or if the RFID tag $16_1$ cannot be detected, the computing device 26 generates one of a plurality of different notification alarm protocols based on the particular triggering event (block 235).

The wireless communication reader 20 can detect or read the identification device or RFID tag $12_1$ associated with the device $10_1$ (block 240). In response, the computing device 26 automatically checks the data associated with the device $10_1$. The reader 20 may continuously attempt to detect or read the device tag $12_1$. Once the RFID tag $12_1$ is detected, the computing device 26 automatically confirms the device's information and continuously or periodically checks for the occurrence of triggering events associated with the device $10_1$ (block 230). If a triggering event occurs, the computing device 26 generates one of a plurality of different alarm protocols based on the particular triggering event (block 235).

Other triggering events and corresponding alerts are contemplated. For example, a triggering event may occur when an unauthorized technician or user attempts to install a device $10_1$. An unauthorized user may be a user who is not certified or current with his or her training. An unauthorized user may also be a user that the computing device 26 does not recognize. For example, the unauthorized user may not have proper technician identification $14_1$.

If no triggering events occur, the technician $14_1$ may proceed with installation of the device $10_1$. The location of the installation is checked via the GPS receiver 22 (block 250). Next, the ambient temperature of the installation site is checked by the temperature sensor 24 (block 260). Based on the ambient temperature of the installation site, the computing device 26 and/or the processor 50 is configured to automatically adjust the torque to be applied to one or more fasteners 11 (e.g., threaded bolts) of the device $10_1$ by the installation tool 150 as the technician $14_1$ installs the device $10_1$ (block 270). All the data/information with respect to the installation (i.e., data/information regarding the technician, installed device, temperature, location, time and date) is concurrently recorded by the computing device 26 in the log data 75 (block 280).

The device data 72 may include authorized users for a respective device. In some embodiments, this data is included on the identification device $12_1$ associated with the particular device $10_1$, and the reader 20 may electronically read the data and transmit the data to the computing device 26 (FIG. 1). The technician data 71 may include devices 10 that a respective user is authorized to install. In some embodiments, this data is included on the identification device $16_1$, $16_2$, $16_N$ associated with the particular technician $14_1$, $14_2$, $14_N$, and the reader 20 may read the data and transmit the data to the computing device 26 (FIG. 1).

Various embodiments of the present invention have been described in part above with reference to the system and flowchart illustrations of apparatus, operations, methods, and computer program products. It should also be noted that in other implementations, the function(s) noted in the illustrations may occur out of the order noted in the figures. For example, two blocks/steps shown in succession may, in fact, be executed substantially concurrently or the blocks/steps may sometimes be executed in the reverse order, depending on the functionality involved. Moreover, the functionality of an illustrated block/step may be separated into multiple blocks/steps and/or the functionality of two or more blocks/steps may be at least partially integrated. It will be understood that each block/steps of the figures and combinations of blocks/steps in the figures can be implemented by computer program instructions. These computer program instructions (also referred to as applications) may be provided to a processor circuit (which may be a general purpose computer, special purpose computer, or other programmable data processing apparatus) to produce a machine, such that the instructions, which execute via the processor circuit, create means for implementing the functions/acts specified in the figures.

Figure 5:
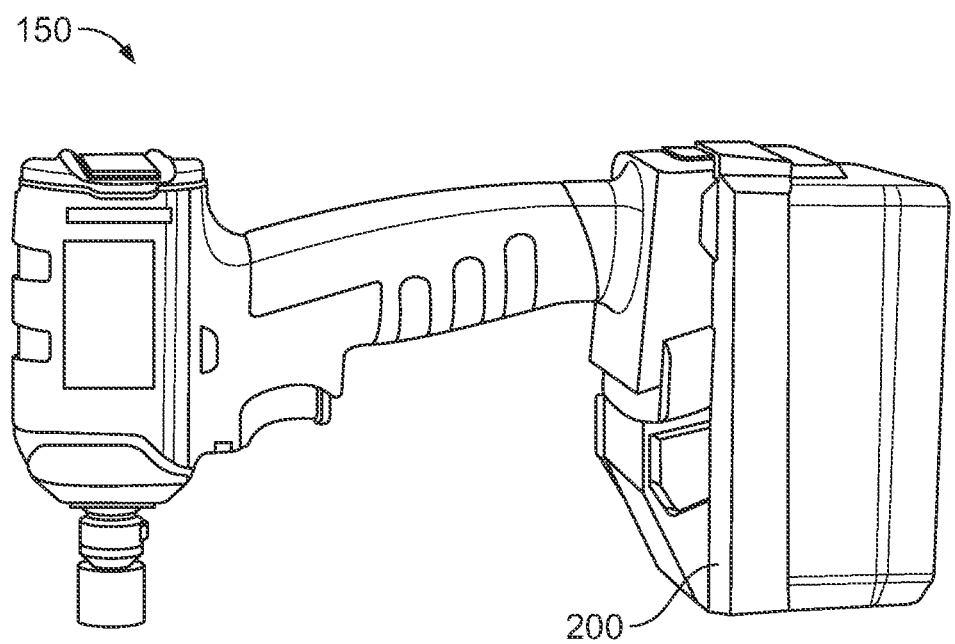
FIG. 5 illustrates an exemplary installation tool that can be used in the system of FIG. 1 according to embodiments of the present invention.
Figure 6:
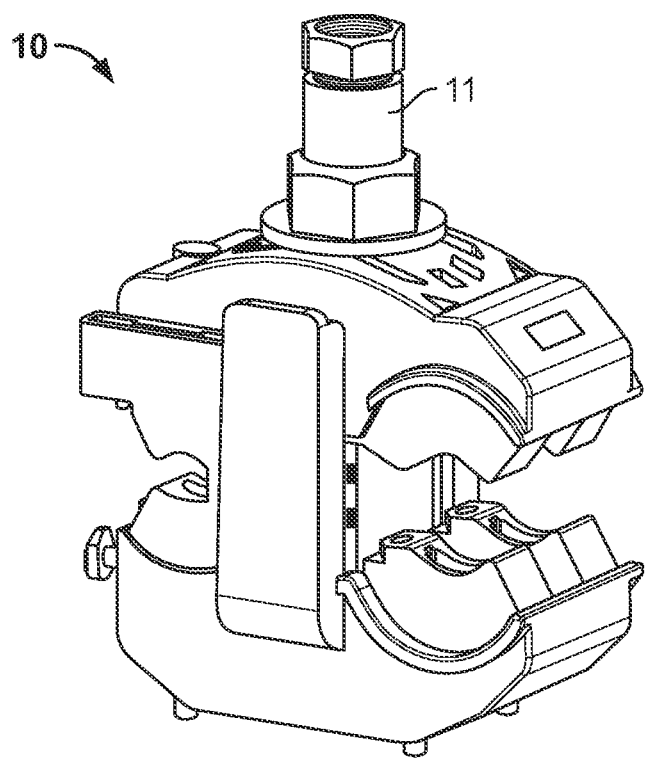
FIG. 6 illustrates an exemplary device (i.e., an insulation piercing connector) that can be installed according to embodiments of the present invention.
Figure 7:
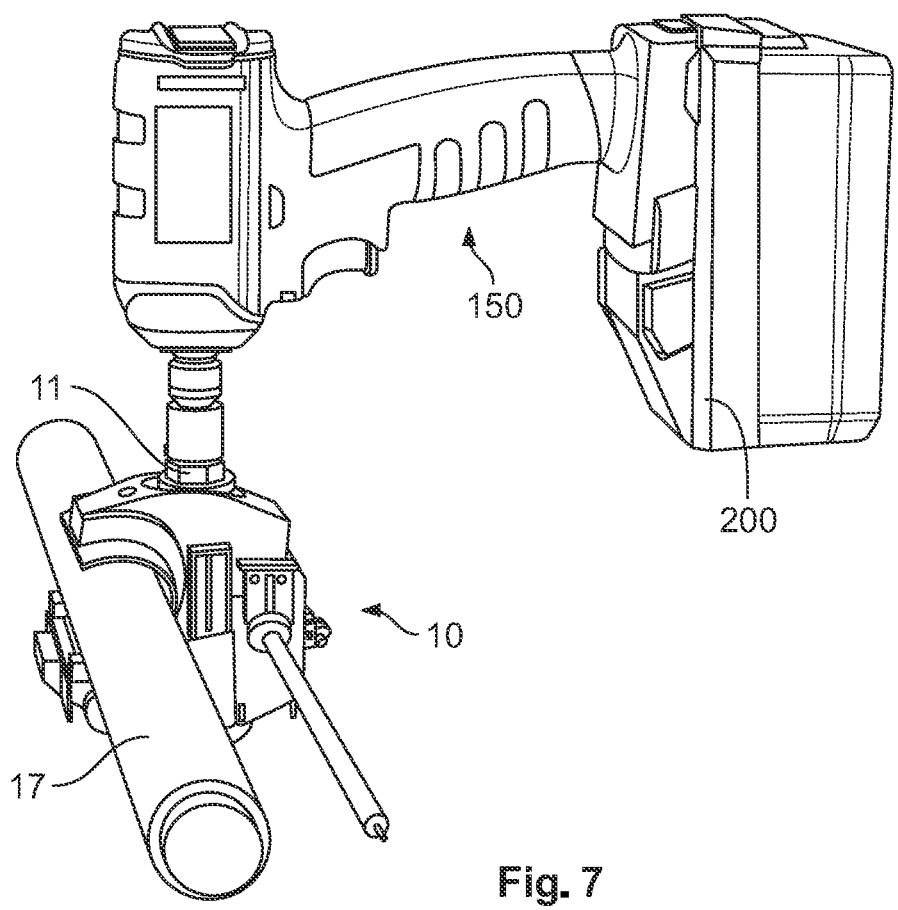
FIG. 7 illustrates the installation tool of FIG. 5 installing the device of FIG. 6 according to embodiments of the present invention.

FIG. 5 illustrates exemplary hardware (i.e., an installation tool 150 having a module 200 installed thereon, i.e., a sensored installation tool) that can be used in the device installation system 100 of the present invention (FIG. 1). As shown, in FIG. 5, in some embodiments, the tool 150 may be a cordless drill or crimping and other special cable prep tools or the like. FIG. 6 illustrates an exemplary device $10_1$ (an insulation piercing connector) that may be installed using the system 100 of the present invention (FIG. 1). As shown in FIG. 6, the insulation piercing connector $10_1$ includes a threaded fastener 11 (e.g., bolt) that has a torque profile (parameters/information) required for proper fastening during installation. In general, the torque parameters of the fastener 11 is set based on a device's identity and ambient temperature during installation. For example, the fastener 11 may be a M8 to M18 size bolt. In some embodiments, the fastener 11 may have a torque range between about 5 Nm and about 50 Nm. However, the tool 150 may be configured to accommodate different size fasteners 11 and/or torques. FIG. 7 illustrates the installation tool 150 being used to fasten (or shear off) the fastener 11 of the device 10 (i.e., to the proper torque) when the device $10_1$ is installed on a cable 17.

Figures 8A, 8B:
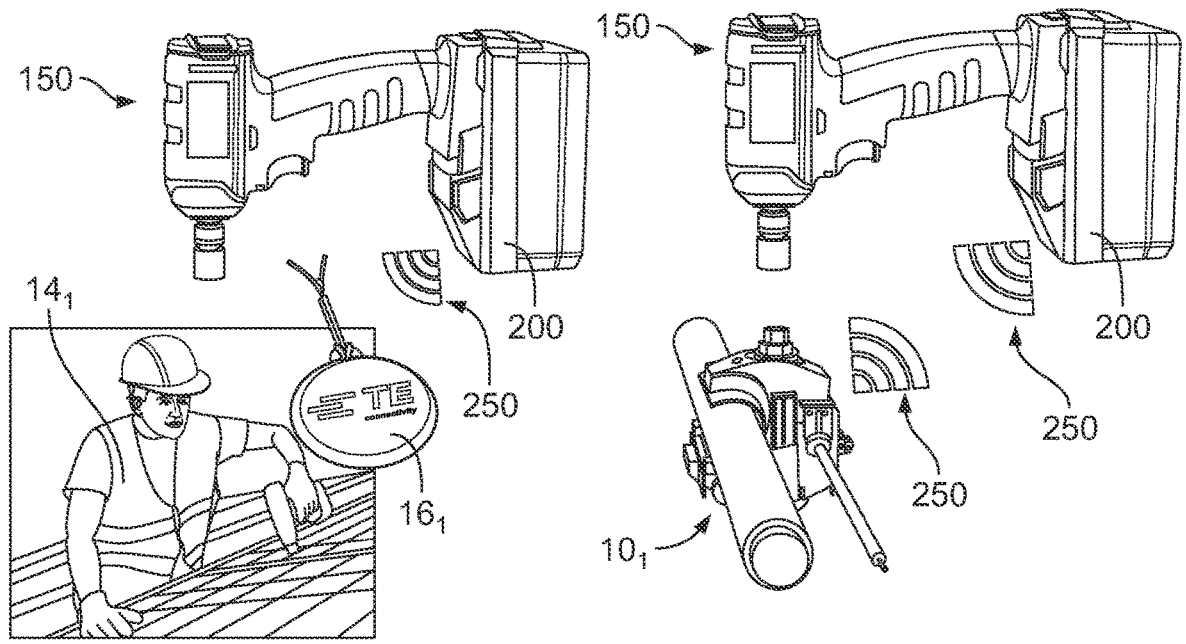
FIGS. 8A-8C illustrates exemplary operations using the installation tool of FIG. 5 to install the device of FIG. 6 according to embodiments of the present invention.
Figure 8C:
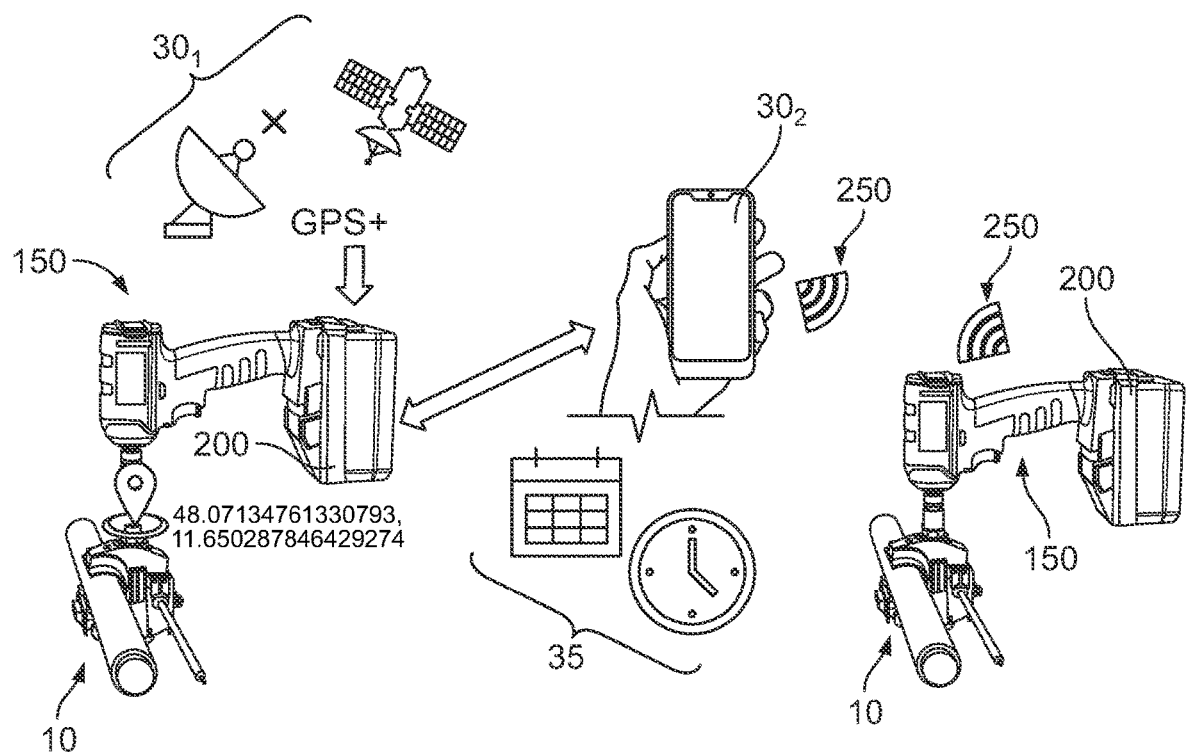

FIGS. 8A-8C illustrate exemplary operations using the installation tool 150 to install an insulation piercing connector device $10_1$ within the system 100 according to embodiments of the present invention. As shown in FIG. 8A, the reader 20 (e.g., residing within the module 200 of the installation tool 150) reads the identification device or RFID tag $16_1$ of the technician $14_1$ that will perform the installation of the device $10_1$ via a corresponding radio-frequency 250. As described above, absent any triggering events (e.g., the technician not being certified), the technician $14_1$ is provided access to use the installation tool 150 to install the device $10_1$.

Next, as shown in FIG. 8B, the reader 20 (e.g., residing within the module 200 of the installation tool 150) reads the identification device or RFID tag $12_1$ of the device $10_1$ to be installed via a corresponding radio-frequency 250. The RFID tag $12_1$ contains information about the product such as the device name 72A, the make and/or model number of the device 72B/72C, the serial number of the device 72D (i.e., device information), and installation temperature limits and corresponding torque limits 72E (i.e., torque information). As described above, the device information and torque information may be recorded in the log data 75 (see also, e.g., FIG. 2 and FIGS. 3A-3E).

As shown in FIG. 8C, in some embodiments, the GPS receiver 22 (e.g., residing within the module 200 of the installation tool 150) is configured to receive the GPS coordinates of the location where the device $10_1$ is being installed. In some embodiments, the accuracy of the GPS coordinates may be within centimeters of the installation location. As further shown in FIG. 8C, in some embodiments, the date and time 35 of the installation may be recorded and uploaded to a remote device $30_2$ (e.g., a smartphone). Based on parameter settings obtained through the RFID tag $12_1$ of the device $10_1$ to be installed and real-time feedback based on the ambient temperature in the vicinity of the device $10_1$, a controlled installation of the device $10_1$ may be performed by the technician $14_1$. In addition, all the data/parameters (i.e., who, what, where, when, and how) with respect to the installation of the particular device $10_1$ may be recorded (i.e., in the log data 75, see FIG. 2).

Figure 9A:
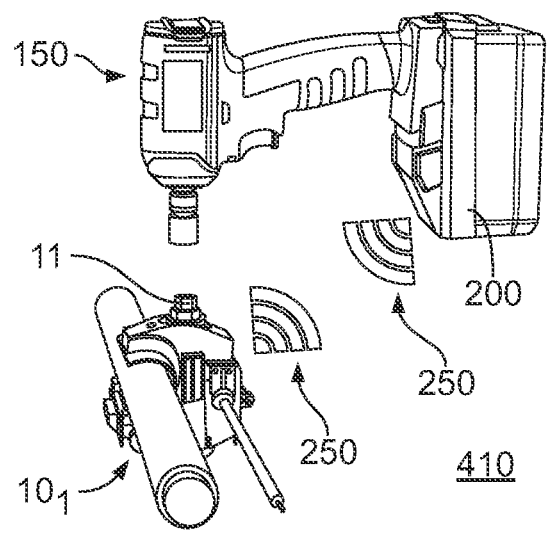
FIGS. 9A-9C shows further exemplary operations using the installation tool according to embodiments of the present invention.
Figure 9B:
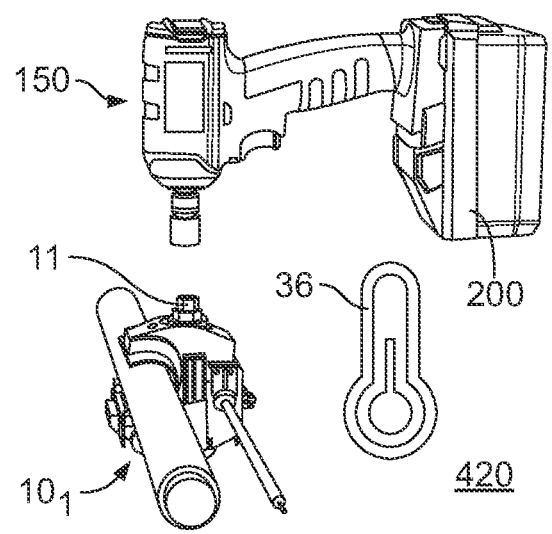
Figure 9C:
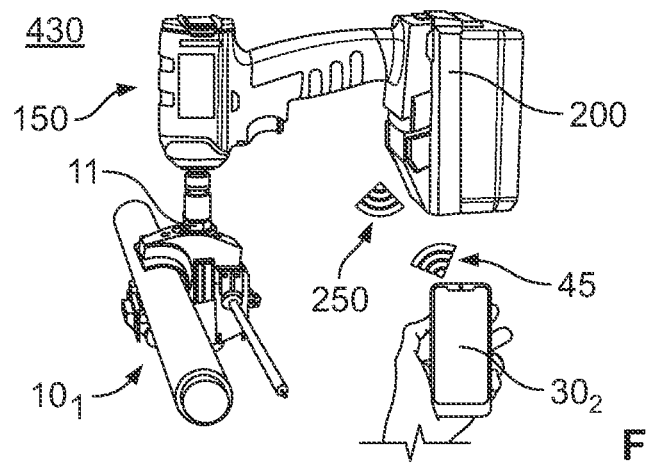
Figure 9D:
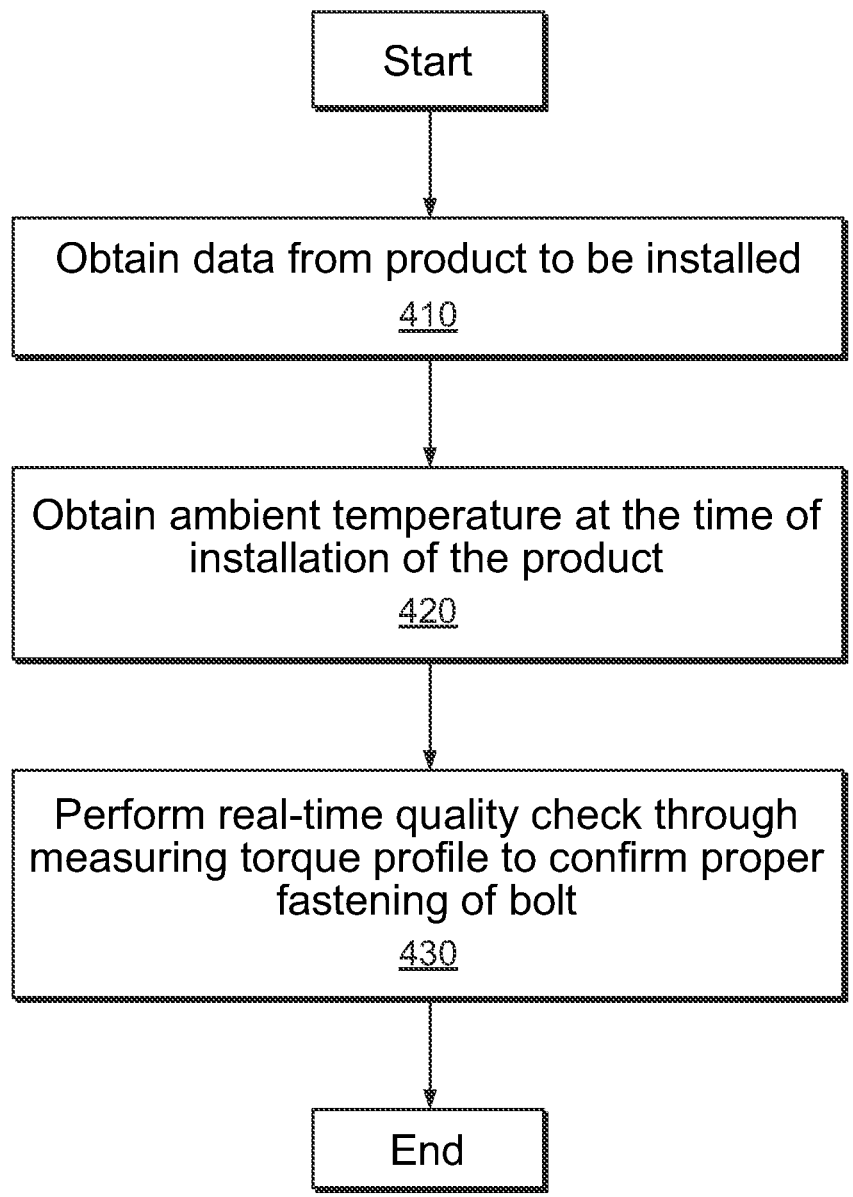
FIG. 9D is a flow diagram illustrating the exemplary operations shown in FIGS. 9A-9C according to embodiments of the present invention.
Figure 10A:
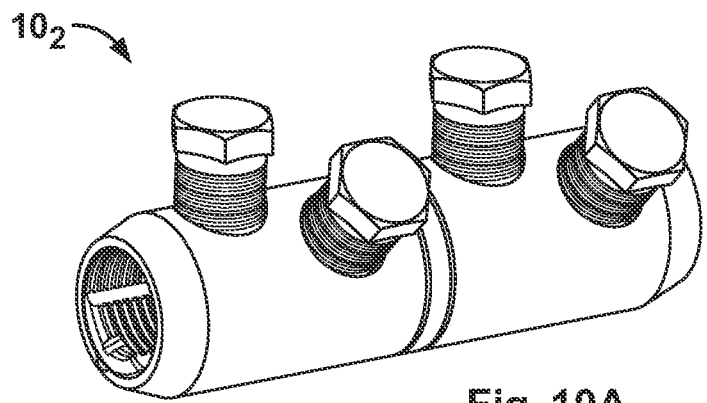
FIGS. 10A-10F show additional exemplary devices (i.e., shear bolt connectors) that can be installed according to embodiments of the present invention.
Figure 10B:
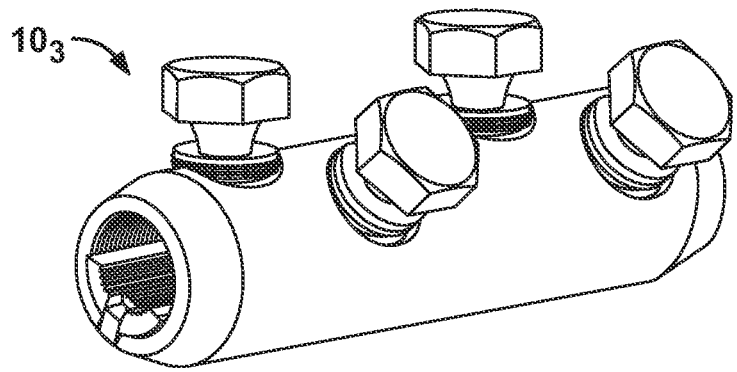
Figure 10C:
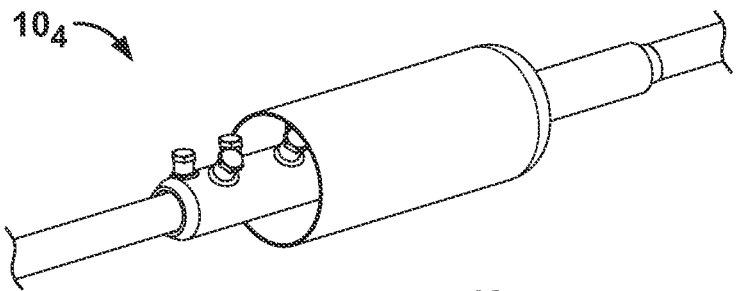
Figure 10D:
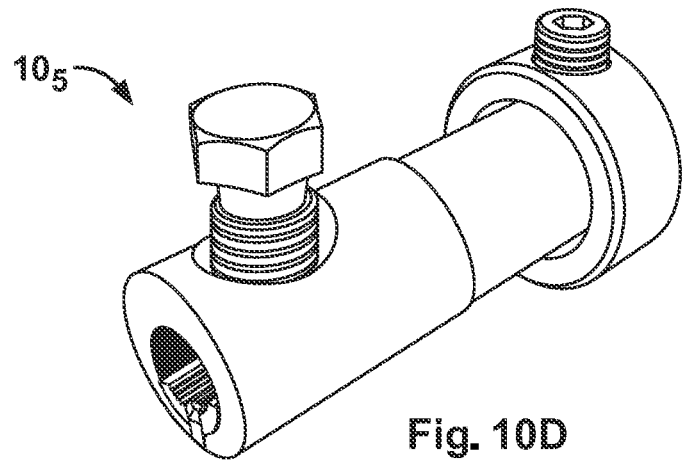
Figure 10E:
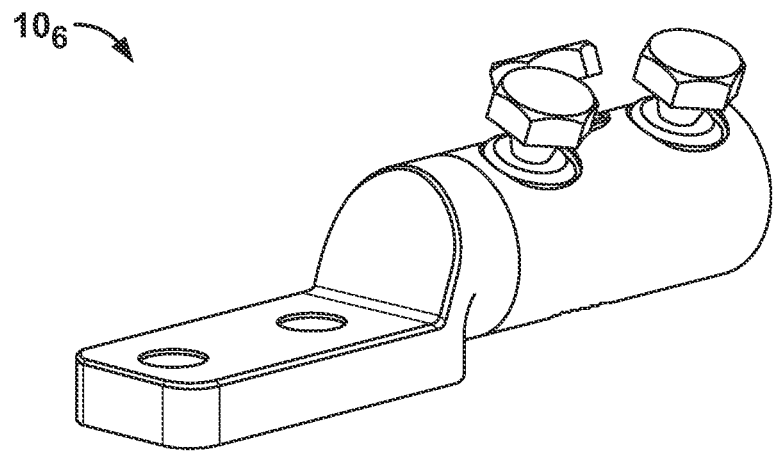
Figure 10F:
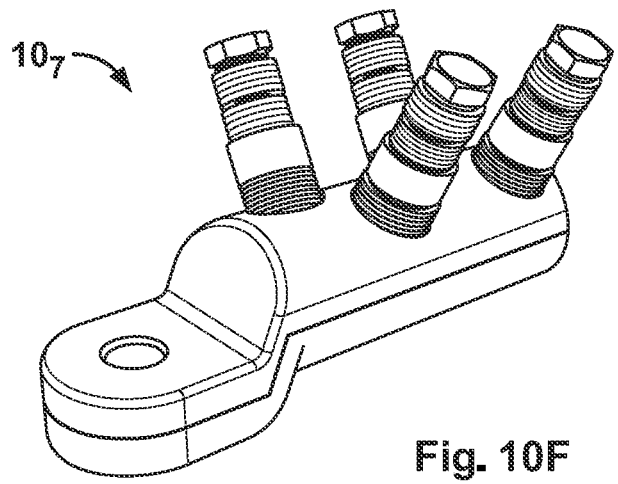

FIGS. 9A-9C show further exemplary operations using the installation tool 150 within the device installation system 100 of the present invention. FIG. 9D is a flow diagram illustrating the exemplary operations shown in FIGS. 9A-9C according to embodiments of the present invention.

As shown in FIG. 9A and FIG. 9D, the reader 20 (e.g., residing within the module 200 of the installation tool 150) reads the identification device or RFID tag $12_1$ of the device $10_1$ to be installed via a corresponding radio-frequency 250 which relays information about the device $10_1$ (block 410). The information relayed from the device $10_1$ may include a corresponding torque information based on ambient temperature 36.

As shown in FIG. 9B and FIG. 9D, in some embodiments, the temperature sensor 24 (e.g., residing within the module 200 of the installation tool 150) obtains the current ambient temperature 36 at the time of installation (block 420) (see also FIG. 2).

As shown in FIG. 9C and FIG. 9D, based on parameter settings obtained through the RFID tag $12_1$ of the device $10_1$ to be installed and real-time feedback based on the current installation conditions (e.g., ambient temperature 36), a controlled installation of the device $10_1$ may be performed by the technician $14_1$, which includes confirming that the proper torque is used by the installation tool 150 to secure (or shear off) the fastener 11 on the device $10_1$.

FIGS. 10A-10F show additional exemplary devices 10 (i.e., shear bolt connectors $10_2$-$10_7$) that can be installed using the installation tool 150 within the device installation system 100 of the present invention. FIG. 11 shows another exemplary device 10 (i.e., a bolt actuated tap connector $10_8$) that can be installed using the installation tool 150 within the device installation system 100 of the present invention.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

What is claimed is:

1. A device installation system, comprising:
   a device comprising a wireless communication tag, the wireless communication tag storing device identification information and torque information for installing the device via at least one threaded fastener; and
   a tool for applying torque to the at least one fastener to install the device, the tool comprising:
      a wireless communication tag reader;
      a temperature sensor; and
      at least one processor in communication with the wireless communication tag reader and the temperature sensor, wherein the at least one processor is configured to:
         obtain the device identification information and the torque information from the wireless communication tag via the wireless communication tag reader;
         obtain ambient temperature information in a vicinity of the device via the temperature sensor; and
         determine an amount of torque required to apply to the at least one threaded fastener to install the device using the obtained device identification information, torque information, and ambient temperature information.

2. The device installation system of claim 1, wherein the at least one processor is further configured to obtain user identification information from a wireless communication tag associated with a user of the tool.

3. The device installation system of claim 1, wherein the device is an insulation piercing connector, a shear bolt connector, or a bolt actuated tap connector.

4. The device installation system of claim 2, wherein the wireless communication tag associated with the device and the wireless communication tag associated with the user are radio-frequency identification (RFID) chips or tags or near field communication (NFC) chips or tags.

5. The device installation system of claim 1, wherein the wireless communication tag reader, the temperature sensor, and the at least one processor are installed on or within a housing of the tool.

6. The device installation system of claim 1, wherein the at least one processor is further configured to:
   detect a trigger event associated with the device and the user; and
   generate and transmit an electronic alert and notice responsive to the trigger event.

7. The device installation system of claim 1, wherein the tool further comprises a wireless transmitter configured to transmit the obtained device identification information, torque information, and ambient temperature information to a remote device.

8. The device installation system of claim 1, the tool further comprising a Global Positioning System (GPS) receiver configured to determine coordinates of a location of the device.

9. The device installation system of claim 2, wherein activation of the tool automatically detects the wireless communication tag associated with the user of the tool.

10. A tool for installing a device, wherein the tool is configured to apply torque to at least one fastener to install the device, the tool comprising:
    a wireless communication tag reader;
    a temperature sensor; and
    at least one processor in communication with the wireless communication tag reader and the temperature sensor, wherein the at least one processor is configured to:
       obtain, via the wireless communication tag reader, device identification information and torque information from a wireless communication tag associated with the device;
       obtain ambient temperature information in a vicinity of the device via the temperature sensor; and
       determine an amount of torque required to apply to the at least one threaded fastener during installation of the device using the obtained device identification information, torque information, and ambient temperature information.

11. The tool of claim 10, wherein the at least one processor is further configured to obtain user identification information from a wireless communication tag associated with a user of the tool.

12. The tool of claim 10, wherein the wireless communication tag associated with the device and the wireless communication tag associated with the user are radio-frequency identification (RFID) chips or tags or near field communication (NFC) chips or tags.

13. The tool of claim 10, further comprising a wireless transmitter configured to transmit the obtained device identification information, torque information, and ambient temperature information to a remote device.

14. The tool of claim 10, wherein the at least one processor is further configured to:
 detect a trigger event associated with the device and the user; and
 generate and transmit an electronic alert and notice responsive to the trigger event.

15. The tool of claim 10, further comprising a Global Positioning System (GPS) receiver configured to determine coordinates of a location of the device.

16. A method of installing a device via a tool, wherein the device includes a wireless communication tag storing device identification information and torque information for installing the device via at least one threaded fastener, wherein the tool is configured to apply torque to the at least one fastener to install the device and includes a wireless communication tag reader, a temperature sensor, and at least one processor in communication with the wireless communication tag reader and the temperature sensor, the method comprising:
 obtaining, via the wireless communication tag reader, the device identification information and torque information from the wireless communication tag associated with the device;
 obtaining ambient temperature information in a vicinity of the device via the temperature sensor; and
 determining, via the at least one processor, an amount of torque to apply to the at least one threaded fastener to install the device using the device identification information, the torque information, and the ambient temperature information.

17. The method of claim 16, further comprising applying the determined amount of torque via the tool to the at least one fastener to install the device.

18. The method of claim 16, further comprising:
 obtaining Global Positioning System (GPS) coordinates of a location of the device via a GPS receiver associated with the tool.

19. The method of claim 16, further comprising:
 automatically detecting a trigger event associated with the device and the user via the at least one processor, and generating and transmitting via the at least one processor, an electronic alert and notice responsive to the trigger event.

20. The method of claim 16, further comprising:
 automatically detecting the wireless communication tag associated with a user who activates the tool.

\* \* \* \* \*